D. HOYT.
ATTACHING DEVICE.
APPLICATION FILED MAR. 28, 1908.
933,757. Patented Sept. 14, 1909.
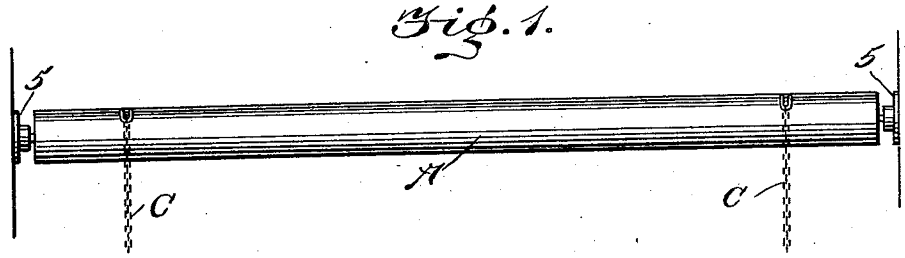
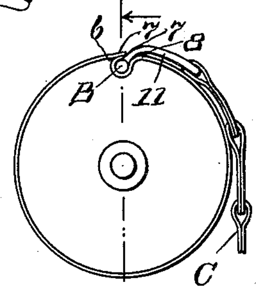
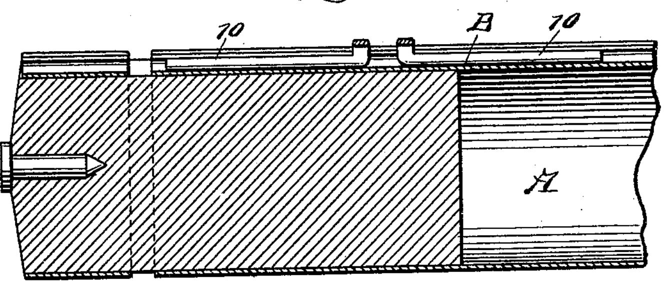
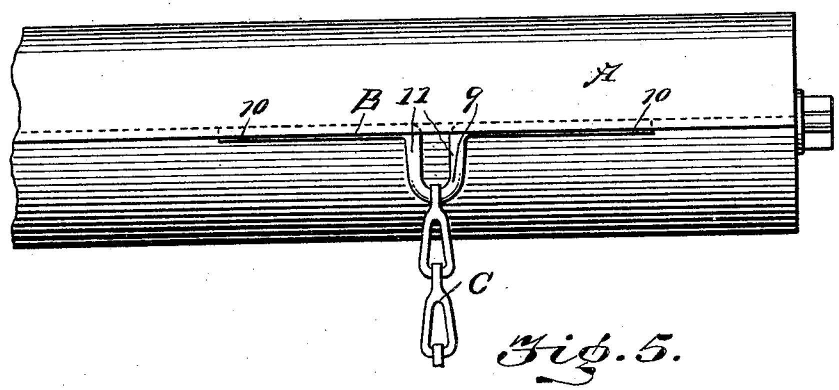
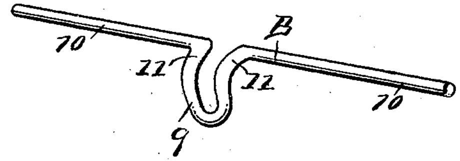
WITNESSES
A. C. Abbott
R. B. Cavanagh
INVENTOR
Daniel Hoyt.
BY Gifford & Bull
ATTORNEYS
ANDREW. B. GRAHAM CO., PHOTO-LITHOGRAPHERS, WASHINGTON, D. C.

UNITED STATES PATENT OFFICE.

DANIEL HOYT, OF NEWARK, NEW JERSEY.

ATTACHING DEVICE.

933,757. Specification of Letters Patent. Patented Sept. 14, 1909.

Application filed March 28, 1908. Serial No. 423,815.

*To all whom it may concern:*

Be it known that I, DANIEL HOYT, a citizen of the United States, and a resident of Newark, in the county of Essex and State of New Jersey, have invented a certain new and useful Improvement in Attaching Devices, of which the following is a specification.

This invention relates to a means or device for connecting chains, cables, bolts or other suspending and connecting means, to a predetermined object and it is especially designed for so attaching the articles mentioned to rollers.

The invention herein set forth is particularly useful for attaching the chains, bolts or cords, supporting a window sash, to a roller, especially a spring-tensioned roller, although I wish it to be understood that I do not limit myself to this particular use.

Heretofore, in attaching the chains or cords to rollers and especially metal rollers, it has been customary in the case of a chain, to solder the same to the metal roller, or otherwise rigidly connect the chain thereto so that it has been impossible to adjust the chain to any position along the length of the roller. Furthermore, it frequently happens that the solder breaks loose, causing the detachment of the chain from the roller, thus necessitating repairing the same with consequent inconvenience and expense. Furthermore, in the case of a cord, belting, or the like it has also been customary to also attach the cord or belting rigidly to the roller and consequently there could be no adjustment between the parts.

The object of the present invention is to devise and use a similar means for connecting chains, cords, belting and the like, to a point of suspension or connection, such as a roller, and especially a metal roller, the construction being one wherein the chain, cord or belting may be rapidly and easily detached and may also be adjusted to any suitable position desired, lengthwise of the roller.

The invention consists in the construction, combination and arrangement of parts set forth in and falling within the scope of the appended claims.

In the accompanying drawings wherein, by way of illustration, I have delineated one embodiment of my invention, Figure 1 illustrates a roller showing my invention in use in the connection of chains to said roller; Fig. 2 is a view in cross section showing more clearly the attaching device and the manner in which it is located relative to the roller; Fig. 3 is a longitudinal sectional view taken on the line 3—3 of Fig. 2; Fig. 4 is an enlarged view showing the roller, and the connecting device supporting a chain; Fig. 5 is a perspective view of the attaching device.

Referring to the accompanying drawings in detail, A indicates a roller of any suitable construction, such as a roller of the type usually designed for suspending car windows, said roller being socketed in brackets 5, 5 connected to a post, wall or the like. This roller, which is preferably a metal roller, and preferably cylindrical in form, has formed longitudinally therein a groove 6 made by the meeting of the ends of the metal when the tubular or cylindrical form of the roller is completed, the ends, shown at 7, 7, being then turned in the same direction, so that the groove 6 is formed with a relatively narrow or contracted mouth 8, the main body of the groove being wider than the mouth portion thereof. It is into this groove that my attaching device, indicated as an entirety by B and shown in detail in Fig. 5, is designed to be inserted. This attaching device comprises preferably, although not necessarily, a metallic rod or bar, or a wire bent centrally to form the loop 9, the main portion or ends of the wire 10 extending straight from said loop. Near the point where the ends of the loop merge or join with the arms 10, such loop is preferably flattened, as at 11, so that when the arm portions are slipped or inserted into the groove 6 of the roller, as shown clearly in Figs. 2, 3 and 4, the flattened portions 11 of the loop will be narrow enough to pass through the contracted mouth of the groove, the main or tongue portion of the loop overlying the roller outside thereof, and being preferably curved or bent to conform to the cylindrical contour of the roller, as will be clearly seen in Fig. 3. The arm portions 10 of the fastener being wider than the contracted mouth portion form a means for locking the attaching device to the roller and obviate the possibility of the attaching device being pulled from the roller by any strain upon the chain. Furthermore, as this attaching device is slipped within the groove and is not rigidly attached to the roller, it is possible to slide the device, and also any chain or other connection, secured to the tongue portion thereof, lengthwise of the roller, to any desired point of adjustment.

In Figs. 1 and 4 I have shown a suspending chain, as C, connected to the tongue portion of the loop, although it will be understood that as a suspending means my device is not limited to the use of a chain connected to a roller, but it may be considered as applicable to other uses where its employment would be beneficial.

In Fig. 1 I have shown the employment of a plurality of chains C, C, each chain, of course, being connected with one of my devices inserted within the roller. In such a construction a window sash or the like may be adjustably and detachably connected to the roller in a manner to permit the adjustment of the chains longitudinally of the roller to any desired position; furthermore, to permit a rapid and easy adjustment of the chains from the roller.

What I claim is:—

1. A roller formed with a longitudinal peripheral groove, said groove having a contracted mouth, combined with a rod, the diameter of which is greater than said mouth and which rod is adapted to enter said groove, said rod being provided with a projection extending through said mouth.

2. A roller formed with a longitudinal peripheral groove extending to the end of said roller, said groove having a contracted mouth, combined with a rod, the diameter of which is greater than said mouth and which is adapted to enter said groove at the end thereof, and which rod is provided with a projection in the form of a loop of less thickness than said mouth through which it extends.

In testimony whereof I have signed my name in the presence of two subscribing witnesses.

DANIEL HOYT.

Witnesses:
R. B. Cavanagh,
W. A. Pauling.